March 6, 1956     A. R. MEYER     2,737,565

WELDING TOOL MANIPULATOR

Filed Nov. 3, 1953     9 Sheets-Sheet 1

March 6, 1956 A. R. MEYER 2,737,565
WELDING TOOL MANIPULATOR
Filed Nov. 3, 1953 9 Sheets-Sheet 2

March 6, 1956     A. R. MEYER     2,737,565
WELDING TOOL MANIPULATOR

Filed Nov. 3, 1953     9 Sheets-Sheet 3

March 6, 1956

A. R. MEYER 2,737,565

WELDING TOOL MANIPULATOR

Filed Nov. 3, 1953

March 6, 1956  A. R. MEYER  2,737,565
WELDING TOOL MANIPULATOR
Filed Nov. 3, 1953  9 Sheets-Sheet 9

United States Patent Office 2,737,565
Patented Mar. 6, 1956

2,737,565

WELDING TOOL MANIPULATOR

Amel R. Meyer, Griffith, Ind., assignor to Graver Tank & Mfg. Co., Inc., East Chicago, Ind., a corporation of Delaware Application November 3, 1953, Serial No. 389,980

17 Claims. (Cl. 219—8)

This invention relates to welding tool manipulators, particularly for the welding of elongated, vertical seams in stationary tank shells and the like. The new manipulator serves mainly to support and guide vertical welding tools such as that of my co-pending application Serial No. 354,119. For this purpose the new manipulator employs a special form of the manipulator features described in my co-pending application Serial No. 252,918.

I have found it generally important so to support and guide a welding tool as to compensate for changes in relative position between the tool and the shell, there being tendencies, largely arising from the use of the inherently heavy tool manipulator itself, to produce changes of such relative position. The magnitude of such changes may amount only to fractional inches, but serious disturbance of welding efficiency can be caused thereby. This applies even in the event that the shell plates are substantially free from surface irregularities permanently incorporated therein.

The new manipulator compensates for such changes of relative position by the use of a structure which preferably comprises a guide track structure adapted to be held in one plane with a more or less vertical groove between the shell plates; a tool carrier adapted to travel along the track structure; a bearing member on the tool carrier, parallel with a horizontal line tangential of the shell; and means to support the welding shoe swingably from the bearing member.

Preferably the apparatus comprises also a second bearing member, parallel with the first and interposed between the same and the shoe. In other words, means are provided to suspend the second bearing member swingably from the first, and other means are provided to support the welding shoe swingably from the second bearing member.

With the aid of such bearing constructions the operation can be made safe, continuous and independent of said changes of relative position. It is simple to keep the carrier guide in the same plane which contains the groove between the plates; and the bearing construction as described is a reliable means to compensate for unavoidable changes in relative orientations of parts within said plane.

The details as to the relative positions, orientations, and behavior of shell plates and other parts, and as to the compensation thereof, will be understood from the detailed description which follows, wherein simple and preferred embodiments of the new apparatus will be described for illustrative purposes.

Figure 1:
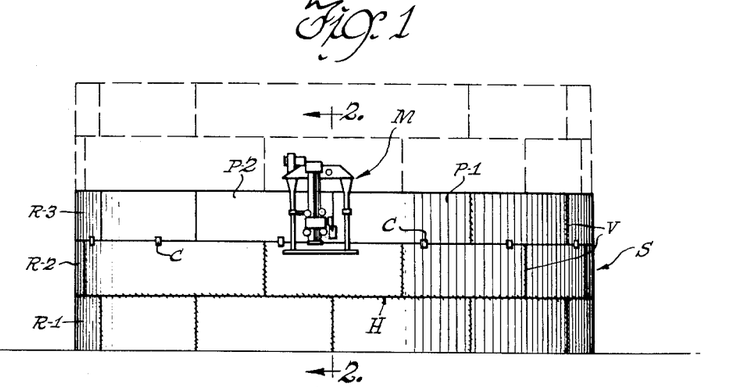
Figure 1 is an elevation of apparatus in accordance with this invention
Figure 2:
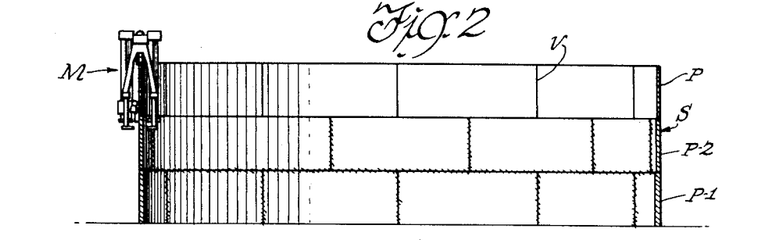
Figure 2 is a section through the apparatus of Figure 1, the section being taken along the lines 2—2 in Figure 1.

Referring first to Figures 1 and 2, the new welding tool manipulator M is shown in operative position on a tank shell S under construction. A first ring of shell plates R–1 has been installed and substantially completed. A second ring of shell plates R–2 has been superimposed thereon, the plates of this second ring being interconnected by vertical weld seams V and secured to the first ring by a continuous horizontal weld seam H. A third ring of shell plates R–3 has been superimposed on the second. The horizontally successive plates P–1, P–2, etc. of this third ring have been installed and temporarily secured together and to the second ring by conventional erection clips C. Some of their intermediate vertical seams V have already been made; and the manipulator M is about to make another seam of this kind.

Figure 3:
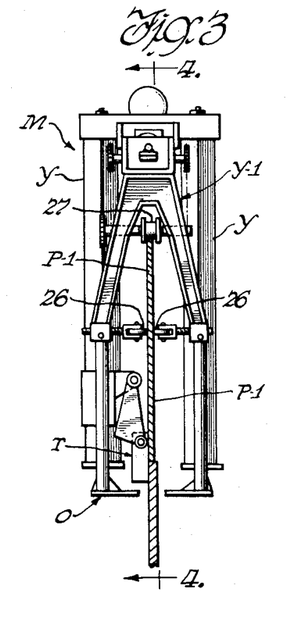
Figure 3 shows principal parts of the apparatus of Figures 1 and 2 in the same general view as used in Figure 2, but on a larger scale.
Figure 4:
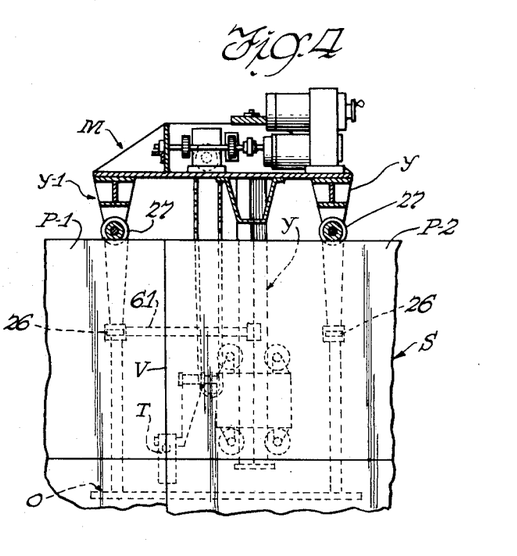
Figure 4 is a section through the apparatus of Figure 3, the section being taken along the lines 4—4 in Figure 3.
Figure 5:
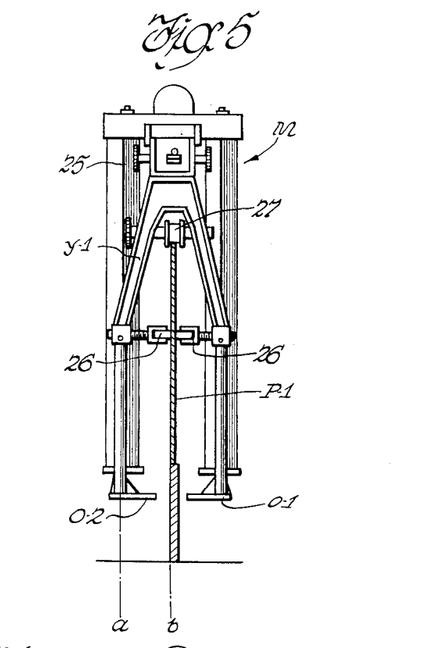
Figure 5 is a highly diagrammatic representation of the apparatus of Figure 3, showing certain geometrical and physical relationships.

For this purpose the manipulator, as shown in Figures 3 and 4, forms a yoke assembly straddling certain shell plates. A first stabilized yoke Y–1 straddles the plate P–1 and a second stabilized yoke Y–2 straddles the second plate P–2. A principal or tool holder yoke Y straddles one or both of these plates, between the two stabilizer yokes. The different yokes are interconnected to form a rigid carriage frame or chassis. This frame also supports operators' platforms O, to allow supervision of the tools T. A single tool T is shown, on one leg of the tool holder yoke Y. It will be understood that generally similar tools can be used on both sides.

Referring now to Figures 5 to 8, the tool holder yoke Y comprises a guide track structure 25 to guide the tool along the path $a$. This path should be kept strictly parallel with the generally vertical plate surface or working area $b$, in order to minimize variations of the welding arc gap, losses of welding flux, etc. Practically, however, it is impossible to keep this path strictly parallel with the plate surface.

In the first place, while the yoke is in stable balance it can hardly be kept from some little tilting. For instance, the operator on the inner operating platform O-1 may stand or sit at a point farther away from the shell than the operator on the outer platform O-2; for this reason and because of different weights of different operators, the yoke is likely to be more or less unbalanced from time to time. An even greater unbalancing force is frequently caused by the weight of the required electric cables (not shown). An excess weight is diagrammatically shown at E, on the inner platform O-1. It applies an outward tilting force $p$ to the lower part of the yoke and an inward tilting force $q$ to its upper part.

These forces are substantially resisted by the shell plates, contacted by guide wheels 26 on lower parts of the stabilized yokes and by support wheels 27 on upper parts thereof. However, the forces $p$ and $q$ may cause slight deflections in parts of the yoke assembly if this assembly is kept desirably light and manageable; and, more important, these forces tend to cause tilting of the yoke assembly to such extent as must be allowed either by resilience or by looseness between the mutually opposed guide wheels 26 or between the flanges 28 of the support wheels 27. The first-mentioned looseness can easily be kept to a negligible amount but the latter must practically be allowed to a rather substantial extent, if the yoke assembly shall be truly practical.

The reason lies in the fact that superposed plate rings R-1, R-2 and R-3 must usually be made with upwardly decreasing plate thickness, for well known reasons of hydrostatic efficiency and plate economy. Accordingly it is practically necessary in tool yokes of the present kind to utilize support wheels capable of running on the edges of either type of plate. In other words the flanges 28 of these support wheels must be spaced from one another to accommodate the lowermost and heaviest plate thickness R-1. It follows that upper and thinner plates R-2 or R-3 have an indefinite position between such wheel flanges; for instance a wheel flange may contact the outer surface of the shell as in Figure 7 or the inner surface of the shell as in Figure 8. Little is gained by any attempt to maintain a preferred lateral or intermediate position by the use of some special profile of the wheel body 29. It is practically unavoidable that some inward or outward shifting of one or both support wheels 27 occurs in actual operation, while the guide wheels 26 are kept on the plate surfaces.

Such shifting and resultant tilting may either be compensated for or aggravated by such slight "barrel" or irregularity as may exist in the plate, as a result of its fabrication. There may be some little vertical convexity, either inward or outward, in a plate surface, as shown with great exaggeration in Figure 6.

Thus the guide path for the tool may slightly diverge from the plate surface, because of tilting of the normal vertical direction $a$ of the path into an irregular direction $x$ and/or because the normal, straight, vertical surface $b$ changes locally into a curve $y$.

Figure 7:
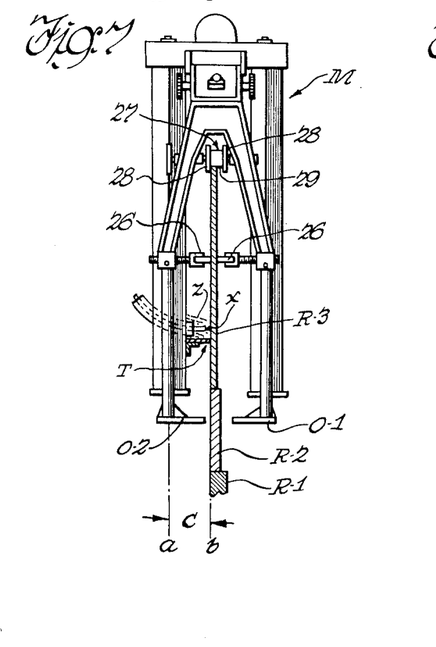
Figure 7 shows apparatus similar to that of Figure 5, in a generally similar view, showing other geometrical and physical relationships.
Figure 8:
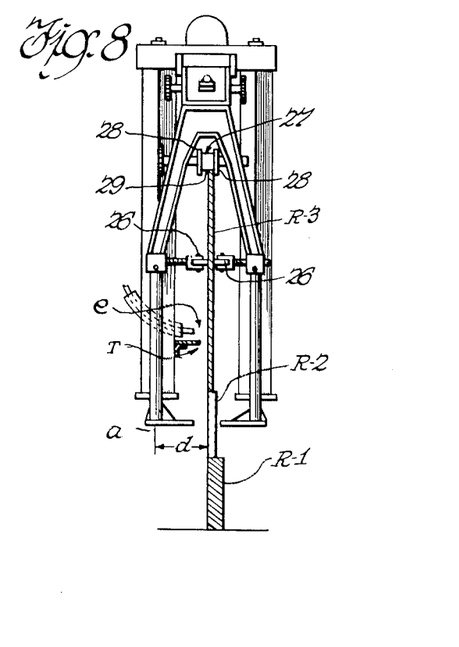
Figure 8 shows the apparatus of Figure 7 in a generally similar view but in a different position.

Moreover the yoke assembly may shift horizontally to some little extent, without tilting, as shown in Figures 7 and 8.

It may be assumed that prior to such shift the datum line of the welding tool T had proper distance $c$ from the plate surface $b$, thereby maintaining a suitable arc X submerged in a flux bed Z. The shift to the position of Figure 8 tends to increase the distance $c$ to $d$, thereby tending to interpose a gap $e$ between the electrode tip and flux belt on the one side and the working surface $b$ on the other. Under such conditions, proper welding is impossible.

Figure 6:
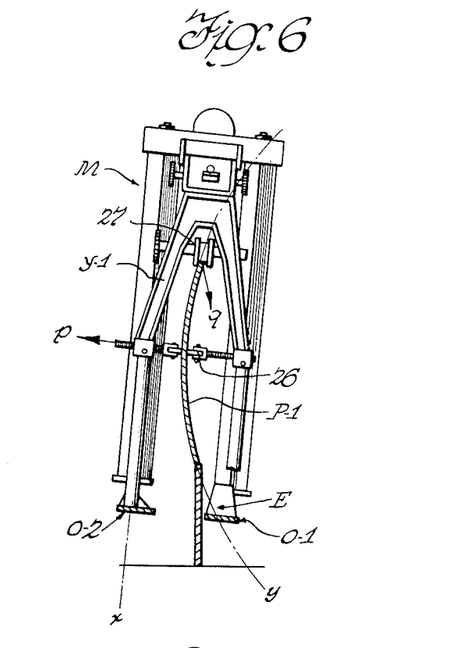
Figure 6 shows the apparatus of Figure 5 in a similar diagrammatic view, illustrating however a different position thereof.
Figure 9:
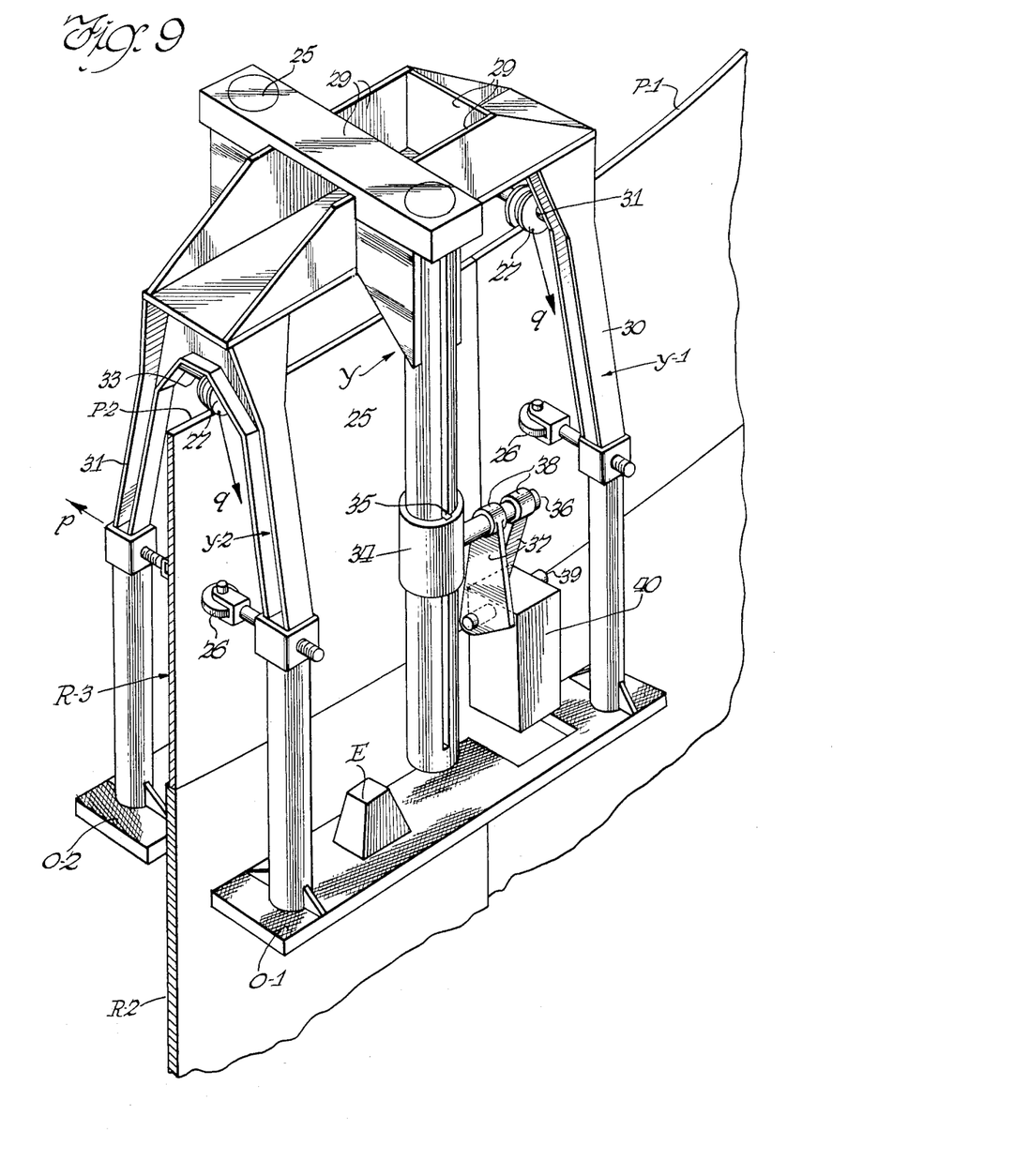
Figure 9 is a perspective diagram of essential parts of apparatus similar to that of Figures 3 to 8, further illustrating the geometrical and physical relationships mentioned.

Figure 9 shows the manner in which these tendencies are compensated for. The two guide posts 25 are here shown as being combined into the rigid working frame Y by an intermediate rigid carriage body 29 at the top ends of the posts; this carriage body being rigid also with a pair of legs 30 straddling the plate P-1 to form the upper part of the first stabilized yoke Y-1, and a similar pair of legs 31 straddling the plate P-2 to form the second stabilizer yoke Y-2. On each leg 30 a rigid bushing 32 is installed, above and across the plate P-1, for the support of the wheel 27, and a similar bushing 33 is installed on each leg 31 for the other support wheels. Thus the wheels 27 are securely connected to the carriage body 29 and thereby to the working yoke Y; and so long as the upper edge of the plates P-1, P-2 is horizontal, as it normally is, the guide columns 25 are safely kept in a plane perpendicular to said horizontal edge. However, within said plane the columns can change position, and so can part of the plate surface, as shown in Figures 6 and 8. Such changes must be compensated for.

For this purpose the working tool T comprises a shoe carrier frame, suspended swingably in said plane. A supporting slide member 34 is diagrammatically shown as a collar, surrounding the post 25 and prevented from rotation by a key and groove device 35. The swingable suspension is secured by means of a pivot arm 36 rigidly secured to the slide 34 and horizontally extending therefrom in a plane parallel to a tangent on the adjacent working area. A swingable frame 37 engages the arm 36 by a pair of bearing members 38. This frame 37 in turn supports another bearing member 39, parallel with the arm 36 and having the welding shoe 40 suspended therefrom. In this manner a pair of parallel bearings 36 and 39 are provided, whereby the shoe 40 can stay in uniform contact with the shell surface, regardless of changeable orientation $x$ of the guide post and/or $y$ of the shell surface.

Figure 10:
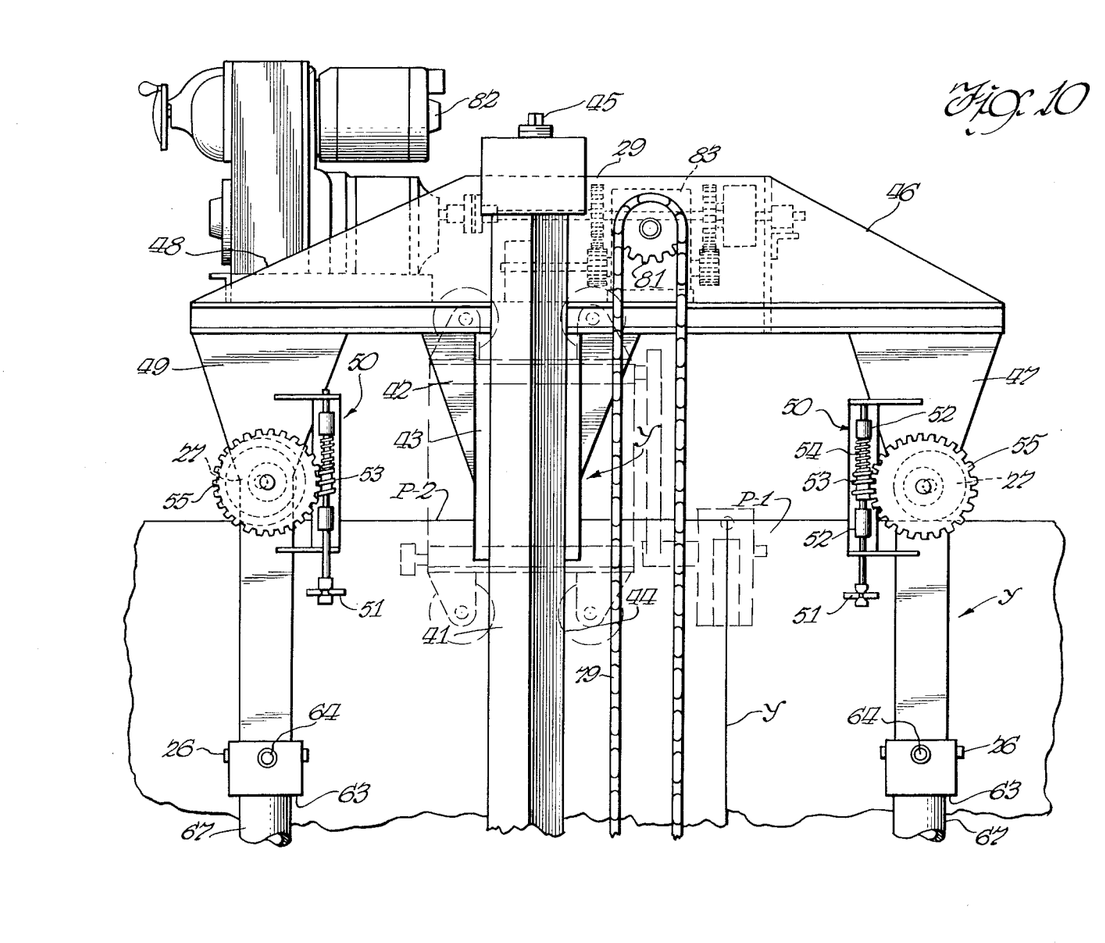
Figure 10 shows the preferred form of an upper part of apparatus similar to that of Figure 1, in a view generally similar to that of said figure but on a considerably larger scale.
Figure 11:
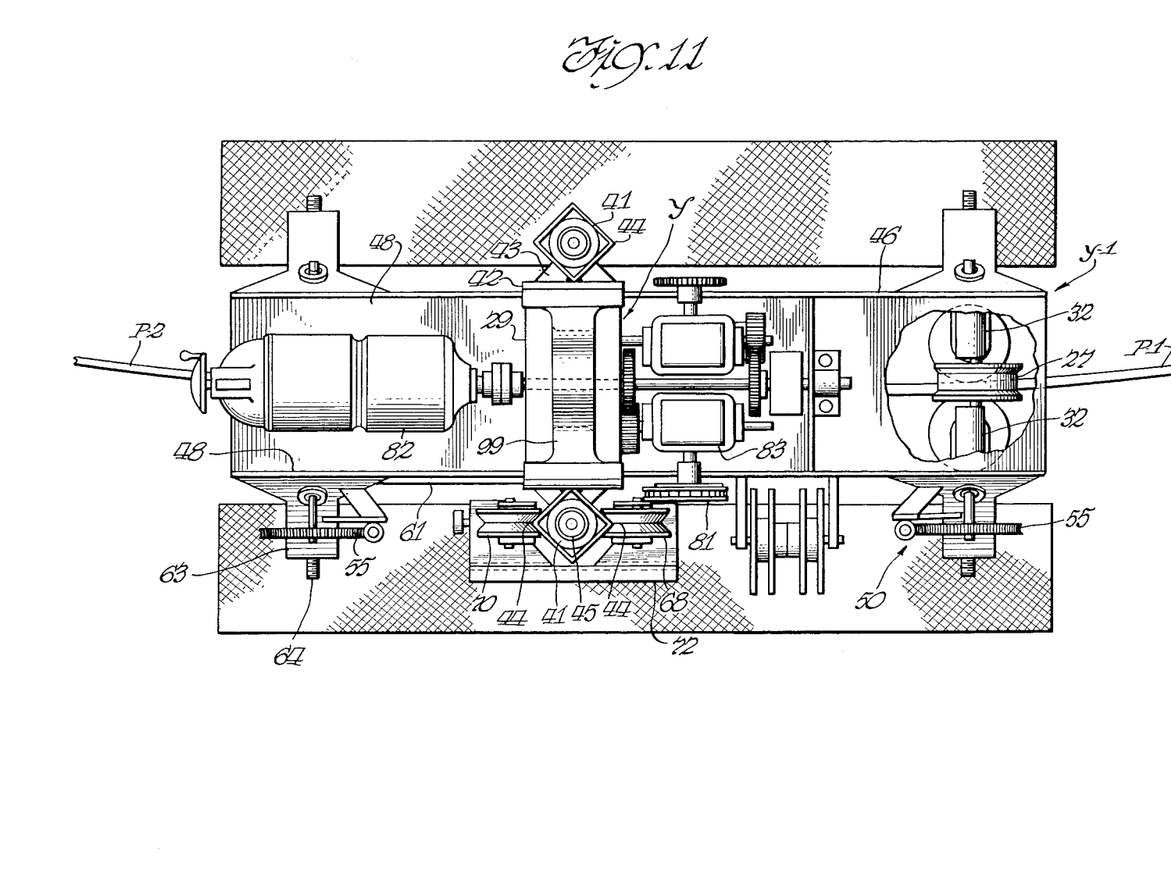
Figure 11 is a plan view of the apparatus of Figure 10, on a scale similar to that of said figure.
Figures 12, 14:
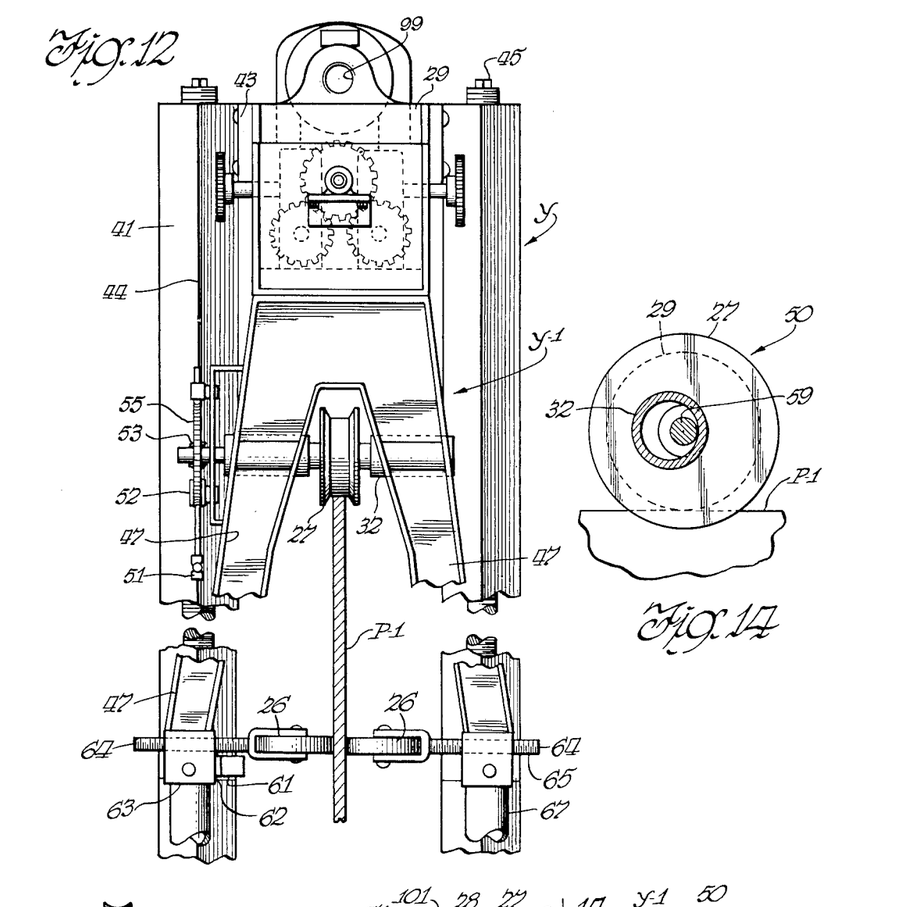
Figure 12 is a fragmentary end view of the apparatus of Figure 10, generally similar to the view of Figure 3 but on the scale of Figure 10.
Figure 14 is a section through the detail of Figure 13, the section being taken along the lines 14—14 in Figure 13.

Referring now to the preferred form of Figures 10 to 21 and particularly to Figures 10 to 12, the working yoke Y is here shown as comprising a pair of upright posts 41 having substantially square cross section, oriented in diamond manner relative to the carriage body 29. Such a post can be constructed for instance by welding two structural L-beams together, facing one another and joined by continuous weld seams along their free edges. The original, accurately rolled corner edges of the beams are best disposed within the vertical plane parallel with the adjacent shell surface. Structural connection between each post 41 and the carriage body 29 can be made by interposed plates and structural members 42, 43, leaving the guide edges 44 unobstructed. In this manner a pair of accurately parallel guide edges 44 can be formed with a minimum of difficulty in original construction and continued maintenance.

In order to simplify shipment and handling, the posts 41 can be made in longitudinally successive sections, suitably held together by tightening bolts 45.

The carriage body 29 comprises longitudinally disposed extensions 46, supporting by means of downwardly extending legs 47 the wheel 27 resting on the plate P-1. A generally similar pair of extensions 48 and legs 49 support the wheel 27 resting on the plate P-2.

It is sometimes unavoidable in actual tank construction for welding purposes that the upper edge of a plate P-1 is located slightly above or below that of an adjoining plate P-2. A slight level difference such as about ⅛ inch is usually regarded as unobjectionable, from the general standpoint of welding design. In connection with an automatic welding tool manipulator, such a level difference may be more serious. For instance, if the wheels 27 have approximately 4 to 5 feet distance from one another and if the "vertical" seam to be welded is approximately 8 feet long, the guide column may tend to be out-of-plumb with the welding seam or joint by as much as ¼ inch. This would be highly objectionable. Therefore one of the carriage legs 47 or 49 is equipped with a micrometer height adjustment device 50.

Figure 13:
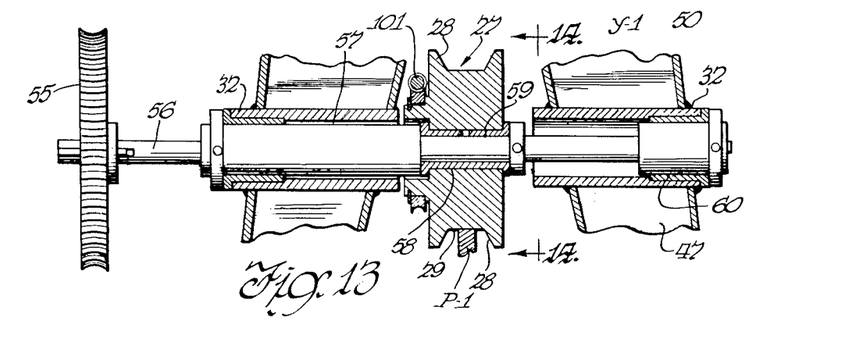
Figure 13 is a vertical sectional end view of a detail from Figures 10 to 12, on a still larger scale.

This device, as best shown in Figures 10, 13 and 14, comprises a hand crank 51 suitably pivoted at 52 and adapted to rotate a worm 53 which may be spring-loaded at 54. The worm 53 engages a worm gear 55 secured to a relatively small shaft 56 which is eccentrically secured to and aligned with a larger shaft 57, extending through one of the bushings 32 of the stabilizer yoke Y–1. The corresponding support wheel 27 is rotatably mounted upon a suitably lubricated collar 58 which surrounds a preferably recessed and shouldered part 59 of the eccentric shaft 57.

Beyond the wheel 27 the shaft 59 extends through the second bushing of the respective yoke, wherein the shaft is suitably pivoted at 60. The eccentricity of the worm gear shaft 56 on the support wheel shaft 57—59 may provide a total stroke of approximately ¼ inch so that a typical worm gear-worm transmission of 40:1, at 53 and 55, means that 10 revolutions of the hand crank 51 are required to raise or lower the yoke by $\frac{1}{16}$ inch relative to the respective drive wheel. In this manner a very accurate micrometer adjustment is provided by very simple means, whereby the guide columns 41 are prevented from losing parallelism with the projection of the seam V, in a plane parallel with the plate surface.

Of course it is equally important that these columns and mainly the pair of guide tracks 44 on each of these columns should be protected from elastic distortion of such magnitude as would interfere with the efficient guiding of the welding shoe. For this purpose certain details of the swinging frame design, to be described hereinafter, are important; they minimize all forces tending to cause either bending or torsion of the post 41 in actual operation. Bending is additionally minimized by still another feature to be described hereinafter, according to which the weight of the welding shoe and intermediate parts is substantially prevented from applying any appreciable lever moments to the post 41.

Even with the small pressures so applied between the welding shoe and the shell, some torsion is unavoidably applied to the column 41. However it is practically prevented from rotating the column to any significant extent, by means of an anchoring or anti-torsion brace 61 secured on the one hand to the back of the column, below the attachment structures 42, 43, and anchored on the other hand to a suitable portion of the stabilizer yoke Y–1 or Y–2 or both. This anchoring brace may be noted in Figures 4, 11 and 12. As shown, it is connected with the stabilizer yoke adjacent the area 62 forming part of said yoke which also incorporates the socket 63 for the carrier 64 of the respective stabilizer wheel 26. In this manner the brace 61 is anchored to the most firmly located portion of the stabilizer structure. The wheel carriers 64 are shown adjustable as by screw-threading 65 so that they can be spaced from one another and from their sockets by different distances, accommodating different thicknesses of plates P–1, P–2 and different positions of the support wheel on the edge of such plates.

Figure 15:
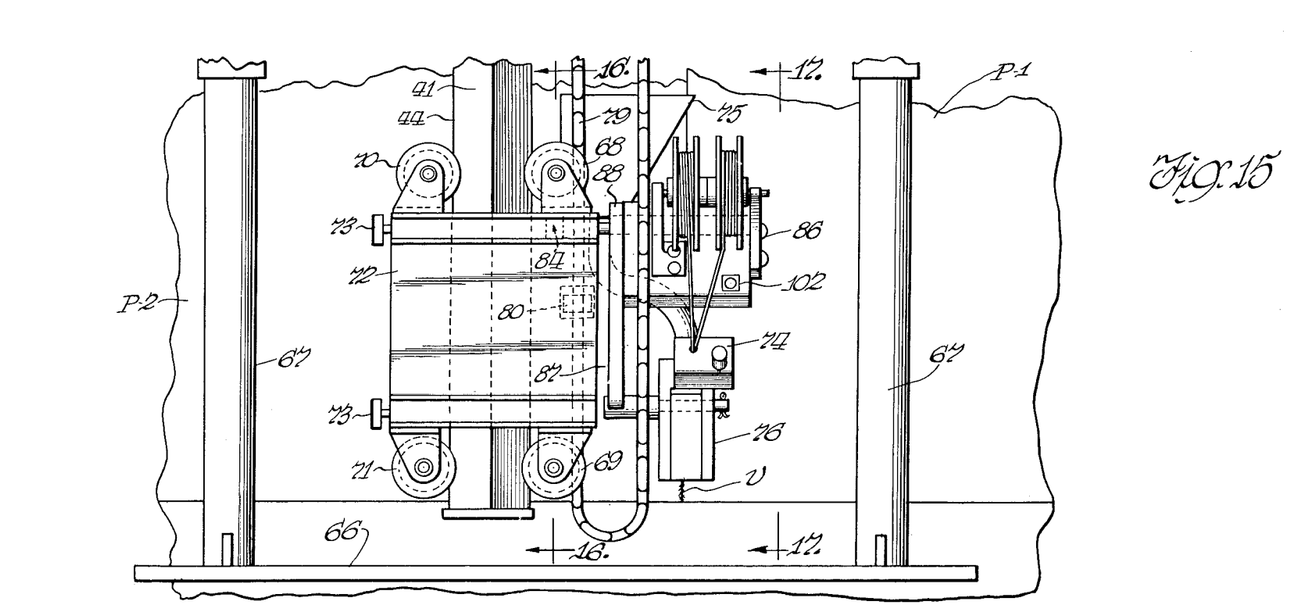
Figure 15 shows the preferred form of a relatively lower part of apparatus similar to that of Figure 1, in a view generally similar to that of said figure but on the scale of Figures 10 to 12.

Referring now to Figure 15 the guide track column 41, 44 extends downwardly to an elevation slightly above an operator's platform 66, preferably supported by uprights 67 from the socket portions 63 of the stabilizer yokes 47, 49. This support at 63 is preferably made adjustable, in well known manner, in order to accommodate different total lengths of posts 41 and different heights of plates and vertical seams to be welded. This general arrangement between the three yokes and the operator's platform will be evident also from Figures 3 and 4. The installation may also provide means such as ladders (not shown) whereby an operator can follow the rising and descending motions of the welding tool and obtain access to the different parts to be supervised or controlled from time to time.

A vertically aligned pair of guide rollers 68, 69 is shown at the right track 44 and a similar pair 70, 71 at the left track 44; the four rollers being mounted upon an elevator body 72 of rigid construction, so as to engage the two upright tracks in freely rolling manner but without appreciable looseness in the common plane of the rollers. For these purposes, conventional micrometer adjustments 73 may be provided for the left hand rollers 70, 71.

The elevator body 72 supports a welding head 74, a flux hopper 75 and a vertical welding shoe 76; this latter shoe being the principal part of the entire apparatus and receiving a suitable feed of electrode material from the welding head 74 and of flux from the hopper 75, through duct means 77 and 78 respectively.

In order to avoid interference with the guide track column 41, the shoe 76 as shown is installed on the side of the elevator body 72. Likewise it is usually desirable, also in the interest of a compact installation, to install the welding head 74 and flux hopper 75 on or adjacent the same side of the elevator body. Thus the arrangement of the principal tool parts 72, 74, 75 and 76 is not symmetrical to the elevator body. Moreover the exact center of gravity of the assembly 72, 74, 75, 76 is subject to slight variations due to gradual depletion of flux and electrode wire. However, the resulting shifting of the center of gravity can be kept within minor limits. The assembly of the elevator body and parts mounted thereon is preferably suspended by a flexible support means such as a chain 79, connected to the elevator body by suitable clips 80 adjacent this assembly's approximate center of gravity. Bending of post 41 is thus minimized.

The upper end of each chain 79, as shown in Figure 10, runs over a hoisting sprocket 81 on the carriage 29. A hoist motor 82 is provided. Desirably, a clutch 83 is interposed between this motor and each sprocket, in order to allow adjustment of relative positions between welding shoes 76 on the two sides of the tank shell, for the proper control of heat input and other welding conditions.

It will be noted that the elevator body and parts mounted thereon can be raised to a top position substantially coinciding with the position of the wheel and carriage structure 27, 47, 29 and with the uppermost part of the guide column 41; there being no interference between the free upward-downward traveling of the rollers 68 to 71 and the rigid attachment between the column 41 and the carriage frame 29. Likewise no interference is presented by the anti-torsion brace 61, attached to the back edge of the column 41. In other words the elevator body and the rollers thereon engage the guide track column substantially in the manner of a C-clamp installed in the front, while the structural attachment of the column is provided at the back thereof. Thus the square section column 41 facilitates not only the accurate positioning of the tracks relative to one another but also the production of a compact and stable yoke mechanism.

Figure 16:
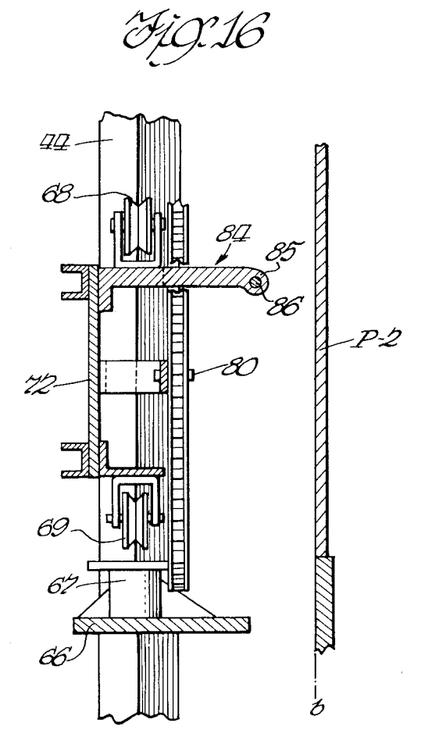
Figure 16 is a section through the apparatus of Figure 15, along the lines 16—16 in Figure 15.
Figure 17:
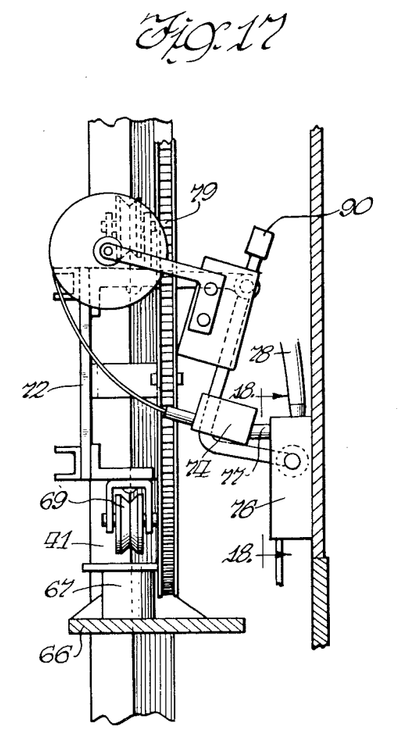
Figure 17 is an elevation of the apparatus of Figure 15, seen in the plane of the lines 17—17 in Figure 15.

Referring now to the important compensator bearings shown in Figures 16 and 17: It will be noted that a bearing device 84 is rigidly secured to the elevator body 72, preferably on the right side of the column 41 as shown and so as not to interfere with the upward-downward travel of the elevator body. This bearing structure is formed in support clips 85. It holds a shaft 86 cantilevering from the elevator body toward the right as shown and oriented horizontaly and parallel with the plane of the rollers 68 to 71, which plane in turn is approximately parallel with the plate surface b as explained above. In order to compensate for the merely approximate nature of this parallelism there is suspended from the shaft 86 a swingable frame 87, shown as engaging the shaft by means of a pivot member 88.

The swinging frame 87 is shown as being approximately L-shaped in end view, and as having parts mounted thereon so that the effective center of gravity of the frame 87 is located in front of the shaft 86, thereby biasing the frame toward the shell plate by the force of gravity. The heaviest part mounted on the swinging frame as shown is the welding head 74, but many modifications are possible with respect to this feature. The magnitude of the biasing force can be adjusted, for instance by a variable counterweight 90 on the swingable frame 87.

The vertical distance from the bearing 86 to the shoe 76 is desirably short, in the interest of compactness, but not any shorter than about one to two feet because otherwise the required forward or backward swing might lead to undesirable, irregular rising or falling of the welding shoe.

Figure 18:
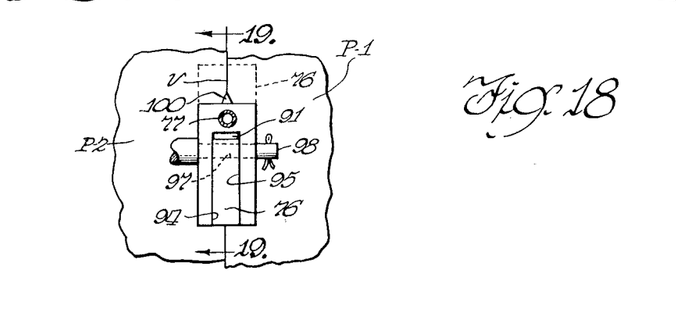
Figure 18 is an elevation of a detail, seen in the plane of the lines 18—18 in Figure 17.
Figure 19:
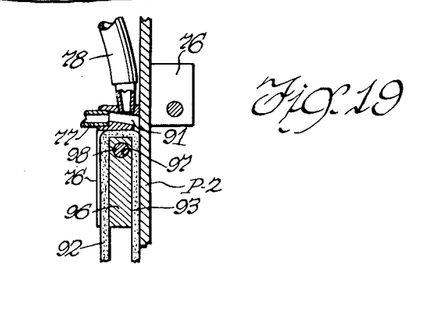
Figure 19 is a section through the detail of Figure 18, in the plane of the lines 19—19 in Figure 18.

The construction of the preferred welding shoe is substantially that of one of my co-pending applications; see Figures 17, 18 and 19. It provides an arc chamber 91, supplied with electrode and flux by the ducts 77 and 78. A belt 92 travels through chamber 91 and through a groove 93 in the face of the welding shoe 76. In order to form the arc chamber 91 and groove 93 the shoe 76 comprises a pair of side walls 94, 95 and an intermediate solid web 96. In actual practice the construction of the shoe may desirably be such as to provide various special apertures and the like, which need not be shown and discussed herein.

It is important however to draw attention to the transverse aperture 97 extending through the side walls and web 94, 95, 96 of the shoe 76, whereby the shoe is swingably supported upon a shaft 98, oriented in a direction parallel with the frame support shaft 86 and cantilevering from the bottom part of the swingable frame 87. The shaft 98 is disposed between the top and bottom ends of the groove 93, while the shaft 86 is disposed substantially above the top end of said groove.

Figure 20:
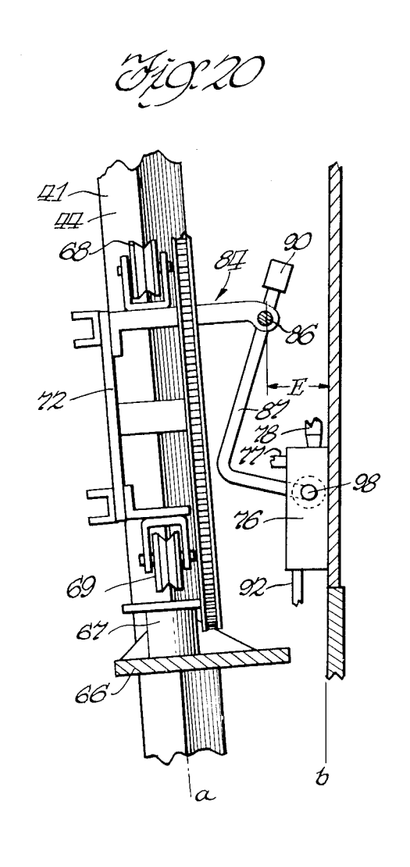
Figure 20 is an end view of diagrammatic character, similar to that of Figures 5 to 8, showing however the position of certain parts disclosed in Figure 17.
Figure 21:
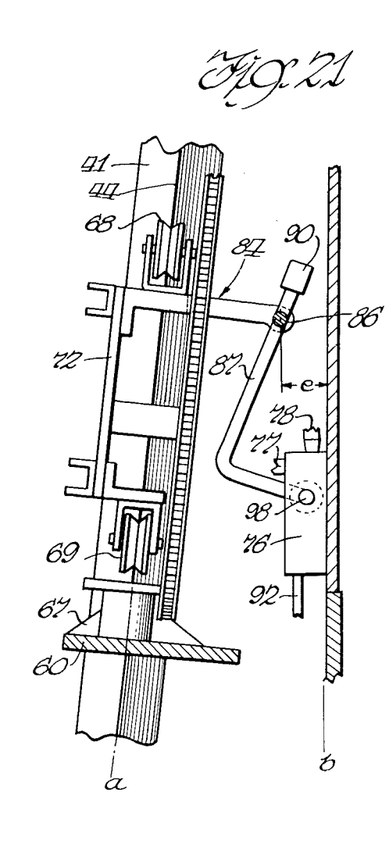
Figure 21 is a view generally similar to Figure 20 but showing the parts thereof in different positions.

The effect of the doubly pivoted suspension 86, 98 will be clear from a consideration of Figures 20 and 21. Normally the direction $a$ of the guide edges 44 is vertical and parallel with a vertical plate surface $b$. So long as this condition is maintained a fixed distance E is interposed between the frame bearing shaft 86 and the plate surface $b$ and the face of the welding shoe is in proper contact with the plate surface. For reasons explained above, the distance E can change, for instance to a smaller distance $e$. By virtue of the swingable support of the frame 87, the proper engagement of the shoe with the plate surface remains undisturbed.

At the same time or at other times it is possible that the vertical plate surface $b$ changes into an inclination $y$, which as shown in Figure 6 may be either forward or backward. To a large extent such further irregularity is compensated for by the additional swingable support 98.

*Operation and auxiliary parts*

Ordinarily the complete unit shown in Figures 3 and 4 is delivered to the construction site in assembled form, although relatively small parts such as the welding shoe 76 or even the entire swinging frame 87 and parts mounted thereon may best be handled separately in order to avoid injury to delicate parts incident to the setting up of the machinery. It may also be preferable to handle the operator's platform 66 and uprights 67 separately and to attach it, at the desired vertical adjustment, so as to suit the personal preference of the operator. Likewise the column 41, when made in separable form, will best be combined and if necessary adjusted by means such as the bolt 45, so as to suit the individual job. The entire unit consisting of the three yokes Y, Y-1, Y-2 and parts rigidly connected therewith is then raised by a crane, which may engage it by means of a suitable lifting hook or eye 99; and the unit is then lowered so as to straddle the plates to be welded, until it comes to rest on the wheels 27. During such lowering the wheels 26 may best be turned so that they run in vertical planes. They are then returned to their normal horizontal orientation and the unit is then propelled along the top edge of the plate, by suitable power either manual or mechanical or electric, until a pointer 100 secured to and aligned with the welding shoe 76 indicates that said shoe is in register with the groove for the seam V to be welded. In order to facilitate such positioning one of the support wheels 27 may be equipped with a suitable micrometer drive 101. Furthermore it may be desirable to determine by means of the pointer 100 whether the groove for the seam V is accurately vertical; this can be done very simply by raising and/or lowering the shoe 76 once with the welding controls at rest. If necessary, any slight out-of-plumb condition of the groove can be compensated for by means of the micrometers 50.

When these preparations have been completed the yoke structure is locked against any further movement or oscillation along the plate edge, for instance by turning the wheels 26 into vertical planes again or by any equivalent mechanical, electrical or other expedient. The elevator body 72 is placed in the proper starting position, usually at the bottom of its travel; the hopper 75 is filled with the required amount of flux, the welding head 74 is provided with the required amount of electrode and the operation is then started by depressing a suitable start push button means 102, which operates in manner known to the art, through suitable instruments (not shown) to start the operation on one or both sides of the plate, that is to supply flux, electrode and current in suitably predetermined manner while beginning to raise the welding shoe 76 and the supporting parts thereof by means of the hoist 83. The manner in which the welding of the vertical seam occurs need not be described herein; important details thereof are described in one of my said co-pending applications.

When the welding shoe 76 and the supporting parts thereof have arrived at the end of their stroke the operation of the hoist, welding head, etc., is stopped automatically or manually; the stabilizer yokes are unlocked by turning the wheels 26 into horizontal planes again and the unit is propelled to the next vertical seam where the entire operation is repeated in generally identical manner.

Either during or between such welding operations the working conditions may change in various respects, for instance by gradual depletion of electrode wire and/or flux or a resupply thereof on either side of the machine, or because an added length of electric power supply cable is picked up, or for various other reasons. In such cases and also in the presence of plate irregularities, various irregular conditions of types as generally illustrated in Figures 6, 8 and 21 are encountered. As a result, the swinging frame 87 and/or welding shoe 76 from time to time changes its exact orientation slightly, as allowed by the respective bearing member 84 and/or 98.

In many such cases, the magnitude of the readjustment is small, as compared with the general dimensions of the machine, but large as compared with the size of the electrode wire and mainly the size of the flux particles.

An important result of the automatic readjustments is that substantially uniform positive pressure is maintained between the melt supporting belt 92 and the working area; this pressure being derived from the substantially constant weight of the swinging frame 87 and parts mounted thereon. For the purpose of producing uniform, sound, vertical weld seams V this feature is extremely important. Uniformity of overall pressure is maintained by the bearing structure 84 alone, and uniformity of distribution of such pressure is maintained by the added bearing structure 98.

It is obvious that suitable safety features can be provided, for instance to prevent accidental movement or dropping of the elevator assembly in case of mechanical failure of the hoist mechanism; also that the desired uniformity and distribution of pressure can be obtained in various modified manners, and that even greater modifications are possible as to many other parts and operations described herein. The scope of the present invention is claimed as follows:

1. A tool manipulator for submerged arc welding of an upright seam between upright stationary shell plates, comprising movable frame means adapted to support welding shoe means for said welding, path defining means operatively connected to said frame means to guide the latter during its movements in determined relation to the seam, support means for said frame means and path defining means inherently accommodating movement of said frame means whereby said shoe means may move from said determined relation, means to move said frame means, means to establish pressure between the shoe means and the seam, and means to keep said pressure substantially uniform regardless of movement of said frame means.

2. A tool manipulator as described in claim 1, additionally comprising means to keep said path within a substantially vertical plane normal to said shell plates, said deflections being substantially limited to said plane.

3. A tool manipulator as described in claim 1, additionally comprising means to distribute said pressure between a plurality of superposed points on said shoe.

4. A tool manipulator for submerged arc welding upright seams between upright stationary shell plates comprising a chassis adapted to be supported from the top of said plates; a frame suspended and adapted to be raised and lowered from said chassis; an auxiliary frame suspended from the first named frame swingably about a horizontal axis parallel with the top of said plates, to allow swinging of the auxiliary frame in a vertical plane transverse of the shell plates; and a welding tool mounted on the auxiliary frame opposite the seam to be welded.

5. A tool manipulator as described in claim 4, additionally comprising means to pivot the welding tool to the auxiliary frame about a horizontal axis parallel with said first named axis.

6. A tool manipulator as described in claim 5, wherein said first named frame comprises an elevator body and a plurality of wheels mounted thereon; said chassis comprising guide means for said wheels to allow movement of the elevator body along said guide means and to restrain other movements of the elevator body.

7. A tool manipulator as described in claim 6, wherein said guide means comprises a pair of upright, parallel rails depending from the chassis on at least one side of the shell plates.

8. A tool manipulator as described in claim 7, wherein the pair of rails are arranged to form a column having square cross section.

9. A tool manipulator as described in claim 9, wherein said rails are former by structural L-beams having their rolled corner edges disposed in a plane parallel with said plates.

10. A tool manipulator as described in claim 4, and including at least one stabilizer yoke depending from said chassis on the two sides of said plates, a guide wheel on the lower part of each leg of said yoke, at least one of said guide wheels being adjustable both angularly and as to its linear distance from said shell plates.

11. A tool manipulator as described in claim 4, additionally comprising hoist means on said chassis, adapted to hoist said frame along the seam to be welded, and a clutch interposed between the hoist means and the frame.

12. A tool manipulator as described in claim 11 wherein each frame is suspended from the hoist means and interposed clutch on the chassis by flexible means connected with the frame at the approximate center of gravity of the frame and parts mounted thereon; said auxiliary frame being mounted on one side of the first mentioned frame.

13. In a tool manipulator for welding seams of stationary plates, said seams being located in other than a horizontal position, the combination of a movable support adapted to be carried by the plates, a welding tool positioned in a determined relation to the seam, means on the support to move the tool, means to bias the tool toward the plate, and articulated means interconnecting the support and tool operative to maintain the tool in said determined relation during movement of the tool.

14. A manipulating apparatus arranged to maintain the welding tool in determined relation to an upright, vertical seam during welding movement of said tool along said seam, said apparatus comprising a support, a movable frame connected to the support, a welding tool, means to bias the tool toward the plate, and an articulated connection between the tool and the frame.

15. A manipulating apparatus according to claim 14, wherein said articulated connection comprises a member having spaced pivotal connections to the tool and frame respectively.

16. A manipulating apparatus according to claim 15, wherein the axes of said pivotal connections are parallel.

17. A manipulating apparatus arranged to maintain the welding tool in determined relation to an upright vertical seam during welding movement of said tool along said seam, said apparatus comprising a support, a linearly movable frame on the support, a welding tool, a member having one end pivotally connected to the frame and the other end pivoted to the tool, said tool and said member being formed and arranged to present a combined center of gravity in such a manner that a vertical line paralleling said seam and intersecting said center of gravity is on a side of said first mentioned pivotal connection remote from said seam.

References Cited in the file of this patent

UNITED STATES PATENTS

| | | |
|---|---|---|
| 1,491,902 | Coble | Apr. 29, 1929 |
| 1,867,979 | Mayoh | July 19, 1932 |
| 2,395,723 | Chmielewski | Feb. 26, 1946 |